United States Patent

[11] 3,592,963

[72] Inventor James E. Young
Pittsford, N.Y.
[21] Appl. No. 546,700
[22] Filed May 2, 1966
[45] Patented July 13, 1971
[73] Assignee Xerox Corporation
Rochester, N.Y.

[54] FACSIMILE TRANSMITTER
12 Claims, 17 Drawing Figs.

[52] U.S. Cl. .......... 178/6, 178/7.1
[51] Int. Cl. .......... H04n 1/00
[50] Field of Search .......... 178/7.6, 7.1, 6, 69.5 TV; 65/DIG. 7; 350/96; 250/227

[56] References Cited

UNITED STATES PATENTS 1,990,023 2/1935 Eremeeff .......... 178/6 UX
2,295,346 9/1942 Jones et al. .......... 178/69.5 TV
2,967,906 1/1961 Blake et al. .......... 178/7.1 UX

*Primary Examiner*—Richard Murray
*Assistant Examiner*—Barry Leibowitz
*Attorneys*—James J. Ralabate, Norman E. Schrader and Ronald Zibelli

ABSTRACT: A rugged, low cost, portable facsimile transmitter for generating tone signals for transmission over telephone lines. The scanning means therein comprises an elongated fixed slit positioned transverse to the document motion direction and a multiapertured endless belt mounted for motion of the apertures lengthwise along the fixed slit. An elongated strip cell photodetector is positioned between the document and the spaced apart fixed aperture and thus light variations reflected from the document impinge upon the photodetector in accordance with the movement of the aperture belt and the information content of the document thereby scanning a beam of light from a line of the document.

INVENTOR.
JAMES E. YOUNG
BY Anthony D. Cennamo
Paul W. Fish
ATTORNEYS

INVENTOR.
JAMES E. YOUNG
BY Anthony D. Cennamo
Paul W. Fish
ATTORNEYS

INVENTOR.
JAMES E. YOUNG

BY Anthony D. Cennamo
Paul W. Fish
ATTORNEYS

INVENTOR.
JAMES E. YOUNG

BY Anthony D. Cennamo
Paul W. Fish
ATTORNEYS

FACSIMILE TRANSMITTER

This invention relates to graphic communication systems and, more particularly, to a portable facsimile transmitter and an improved ruggedized scanning apparatus therefor.

In many aspects of the business world, it is often desirable to rapidly and economically transmit graphic information between one or more remote points and a central point. For example, in the business community, it is often advantageous for a salesman to be able to efficiently and economically transmit orders to the central office for acceptance and/or fillment. Additionally, in the newspaper business, it is desirable for reporters to be able to quickly and completely dispatch graphic information to the main office for processing. The use of two-way radios and telephones, while extremely advantageous in obtaining rapid communications, are not a complete answer for, unaided, they are unable to transmit documents effectly.

Facsimile systems are well known in the art in which the transmitting station converts information on a document through, for example, an electrooptical scanning system into electrical signals suitable for transmission over wire or radio network. At the facsimile receiver, the electrical signals in conjunction with suitable synchronizing signals are used to control a marking apparatus which in response to the received electrical signals recreates a facsimile or copy of the original document.

While prior art facsimile systems, similar to that broadly described above, have been found useful in providing a method of graphic communication between remote points they have not found wide-spread use in the business community because of several inherent limitations such as size, weight and susceptibility to shock and vibration.

The scanning apparatus which is conventionally found in prior art facsimile transmitters is particularly susceptable to shock and thus while being well suited for fixed installations, is not readily adaptable for portable operations. This is primarily because the prior art scanning apparatus employing either a rotating disc, a deflectable mirror or prism must remain accurately aligned to properly function. Such critical alignment requirements render the conventional scanning apparatus highly subjective to shock and vibration.

Further problems evident in prior art facsimile equipment involve the generation of suitable synchronizing signals under varying power conditions. Particularly where power variations are significant and/or where portable power supplies are utilized every variation in the facsimile transmitter power supply is likely to result in unwanted variations in the synchronizing signals. Such variation in the synchronizing signal tends to produce copy degradation, i.e., jitter or streaking, into the reconstituted facsimile copy.

It is, therefore, an object of the present invention to provide an improved, portable facsimile transmitter.

It is another object of the present invention to provide a simplified ruggedized scanning apparatus for facsimile apparatus.

It is yet another object of the present invention to provide a portable facsimile transmitter which is light weight and insensitive to shock and vibration.

It is a further object of the present invention to provide a combined video signal and synchronizing signal generating apparatus for graphic communication systems.

It is yet another object of the present invention to simplify synchronizing apparatus and procedures for portable facsimile apparatus.

For a more complete understanding of the present invention and of the various features and objects thereof reference may be had to the following detailed description in conjunction with the drawings in which.

Figure 9A:
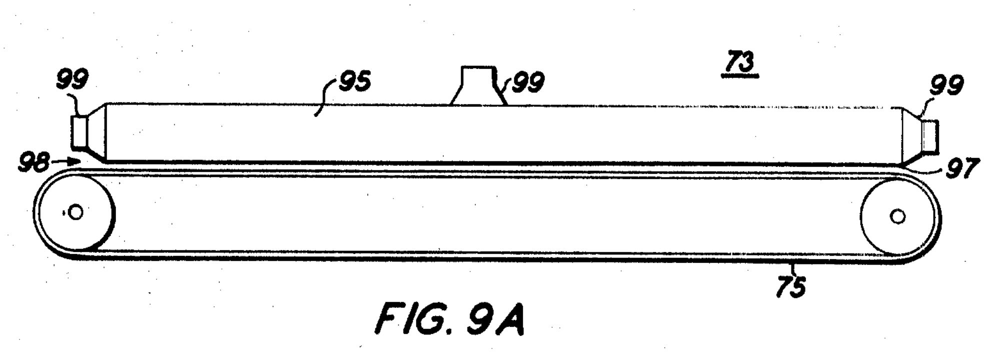
Figure 9C:
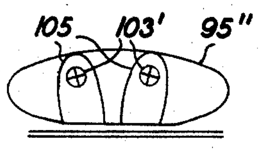
Figure 9B:
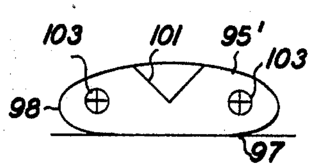
Figure 10:
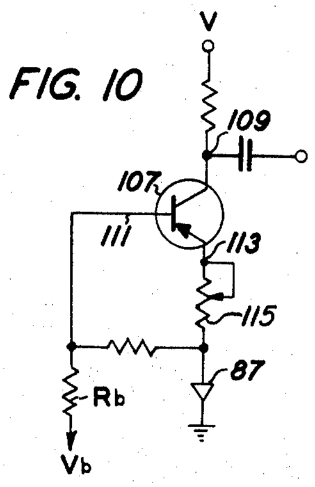

FIGS. 9A, 9B, and 9C are respectively front and sectional views useful in understanding various embodiments of illuminating apparatus in accordance with the principles of the present invention;

FIG. 10 is a schematic diagram of a video amplifier compatible with the strip detector in accordance with another aspect of the present invention.

FIGS. 11A, 11B, 11C and 11D illustrate various features and apparatus useful in understanding the generation of combined synchronizing and video signals and the separation and utilization thereof in accordance with further aspects of the present invention.

Figure 1:
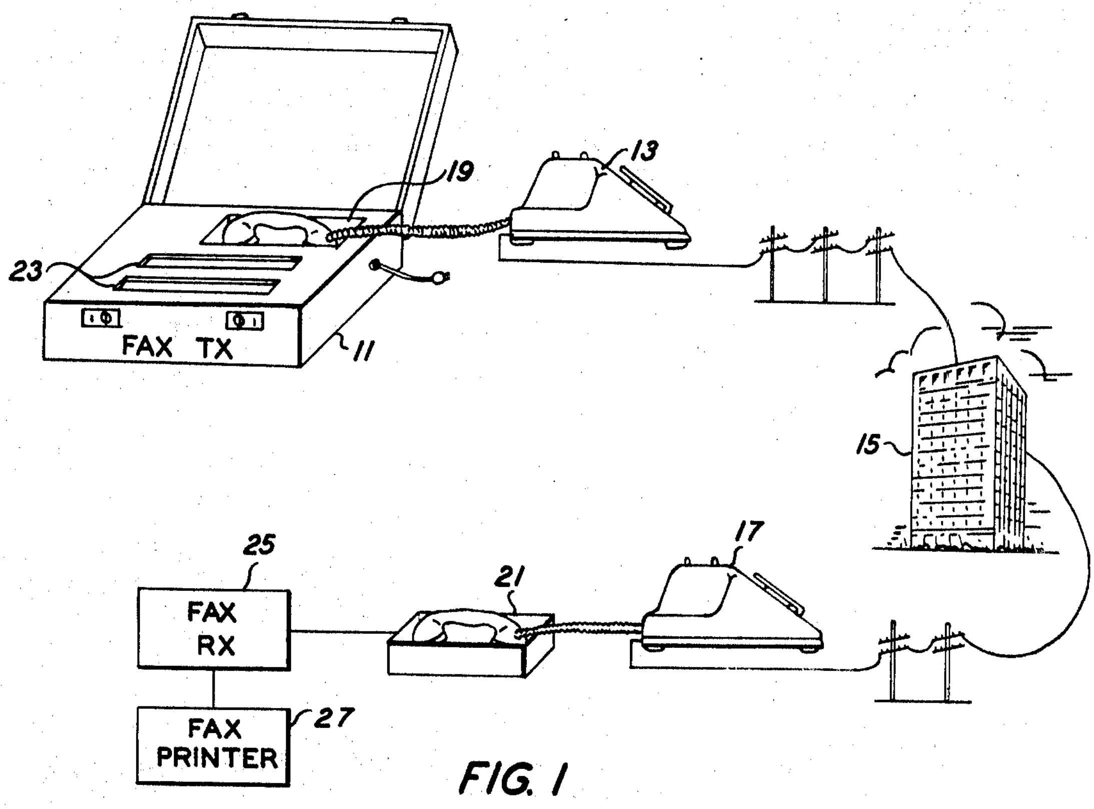
FIG. 1 is a pictorial representation of a facsimile system in accordance with the aspects of the present invention.

Referring now to FIG. 1, there is shown a pictorial representation of a portable facsimile transmitter embodying the principles of the present invention in an operative system. The portable transmitter 11 is shown housed in a case, for example, an attache size case. In operation a conventional telephone 13 would be used to connect the transmitter 11 through a centrally located dialing exchange 15 to a receiving telephone 17. During graphic transmission, i.e., after establishing a connection by dialing the appropriate number, the handset of telephone 13 at the transmitting end is deposited in an acoustical coupling unit 19 of the facsimile transmitter and similarly the handset of receiver telephone 17 is positioned in acoustic coupler 21. A document to be transmitted would be fed through appropriate apertures 23 past a scanning apparatus wherein, as hereinafter is to be more fully explained, the information of the original document would be converted into suitable video and synchronizing signal trains for transmission. At the transmitter acoustic coupler 19 the tonal video and synchronizing signals, as hereinafter will be more fully explained, are acoustically coupled to the input of the telephone handset. In the normal operation the information or video tones, for example, for two level black and white facsimile 1,500 and 2,400 cycles per second signals are coupled to and transmitted via the telephone lines and through appropriate switching networks to the receiver telephone 17. At the receiver, the telephone handset is similarly placed in the acoustic coupling unit 21 wherein the video and synchronizing tonal signals are converted into suitable electric signals for driving a facsimile receiver 25. As is known in the facsimile receiver the video signals are detected and separated from the synchronizing signals and the video and synchronizing signals respectfully are employed to control marking means and phasing means whereby in response to the signals a facsimile of the original document is created by printer 27.

Figure 2:
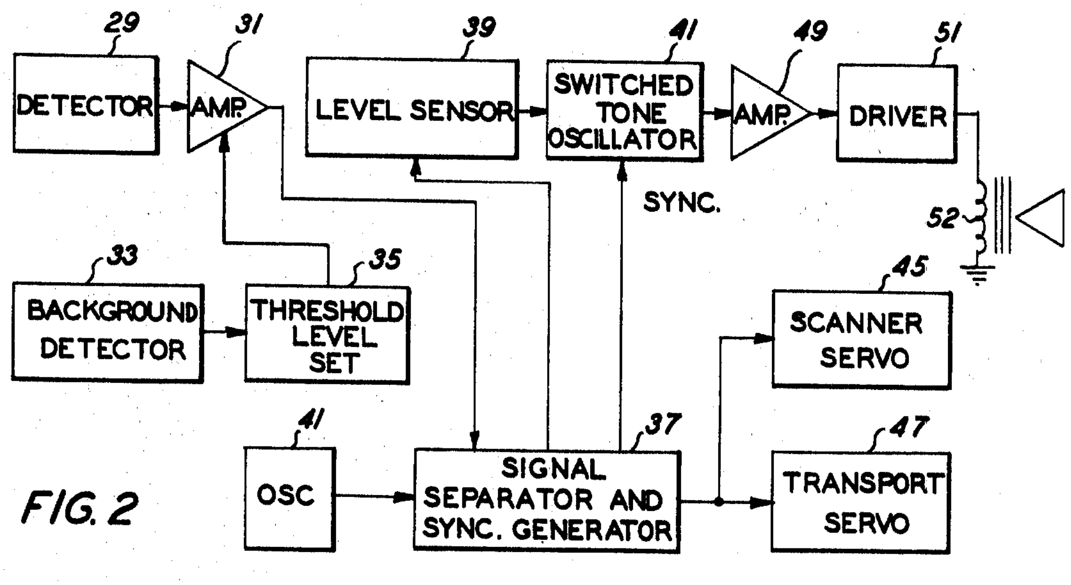
FIG. 2 is a block diagram of a facsimile transmitter compatible with the principles of the present invention.

Referring now to FIG. 2 there is shown a block diagram of a facsimile transmitter compatible with the portable apparatus described in conjunction with FIG. 1. As hereinabove stated the document to be transmitted, as in a normal facsimile system, is converted into a video signal and the video signals are appropriately modified for transmission to the facsimile receiver. As hereinafter will be more fully explained, the scanner in accordance with the present invention comprises a fixed aperture and a selectively apertured rotatably supported endless belt cooperably juxtapositioned therewith. Further, the detector in accordance with the present invention comprises a voltaic light responsive strip cell supported adjacent to the document whereby light selectively passed through the overlapping scanning apertures is reflected from successive elemental areas of a line of the document onto the strip detector 29. The composite video and synchronizing signals emanating from the detector 29 are coupled to one input of amplifier 31. A second input to amplifier 31 is generated by background detector 33 and threshold level circuit 35 to control the gain of amplifier 31 thereby facilitating the detection of video signals in the presence of widely varying background levels arising from, for example, various shades or background colors on original documents. The output of amplifier 31 is coupled to one input of signal separator and sync generator 37. In the signal separator circuit 37, the composite video and synchronizing signals are separated, for example, by filter means, and the video or information signals are coupled to the input of level sensor 39 while the synchronizing signals are coupled to the input of the sync generator circuit.

In the level sensor circuit 39 which for a two level or black and white system may comprise a one shot multivibrator or Schmidt trigger or for a continuous tone system may comprise appropriate amplitude quantizing means, the video signals are characterized or quantized on an amplitude basis. The output of the level sensor 39 is coupled to a switched tone oscillator 41 wherein, in a manner well-known in the art, various appropriate signal frequencies are selectively generated in response to the input of the various possible input signals respectively. In the case of a low speed two level system, 1,300 hertz and 2,400 hertz would be appropriate for white and black levels respectively. Similarly, in a continuous tone system the bandwidth of the transmission system could similarly be divided into a predetermined number of signal frequencies corresponding to the various signal levels.

As is known in the art, in order for the video signals to be properly decoded and utilized at the facsimile receiver, synchronism between the transmitter scanner and the facsimile printer is required. Many schemes are known in the art for accomplishing the required synchronism, however, as will hereinafter be more fully explained, the combined video and synchronizing pulses may be derived in accordance with one aspect of the present invention from a single detector. As shown in FIG. 2, the output from amplifier 31 is coupled to a signal separator and sync generator 37. A local source of timing pulses, for example, from oscillator 41 is coupled as another input to the signal separator and sync generator 37. In response to the input signals, the timing pulses may be suitably modified to generate synchronizing pulses. The synchronizing pulses thus generated are coupled as one input to the switched tone oscillator 41 for inserting synchronizing signals into the video wavetrain and to the respective servocontrol systems 45 and 47 for controlling the scanner and document transport.

The output of the switched tone oscillator 41 comprising the composite video train and the synchronizing pulses is coupled via amplifier 49 to an appropriate line driver 51. As hereinbefore described the line driver may comprise appropriate amplifier means for energizing an acoustic coupler which couples the tone signals comprising the composite video and synchronizing train to the mouthpiece of the transmitting telephone.

Figure 3:
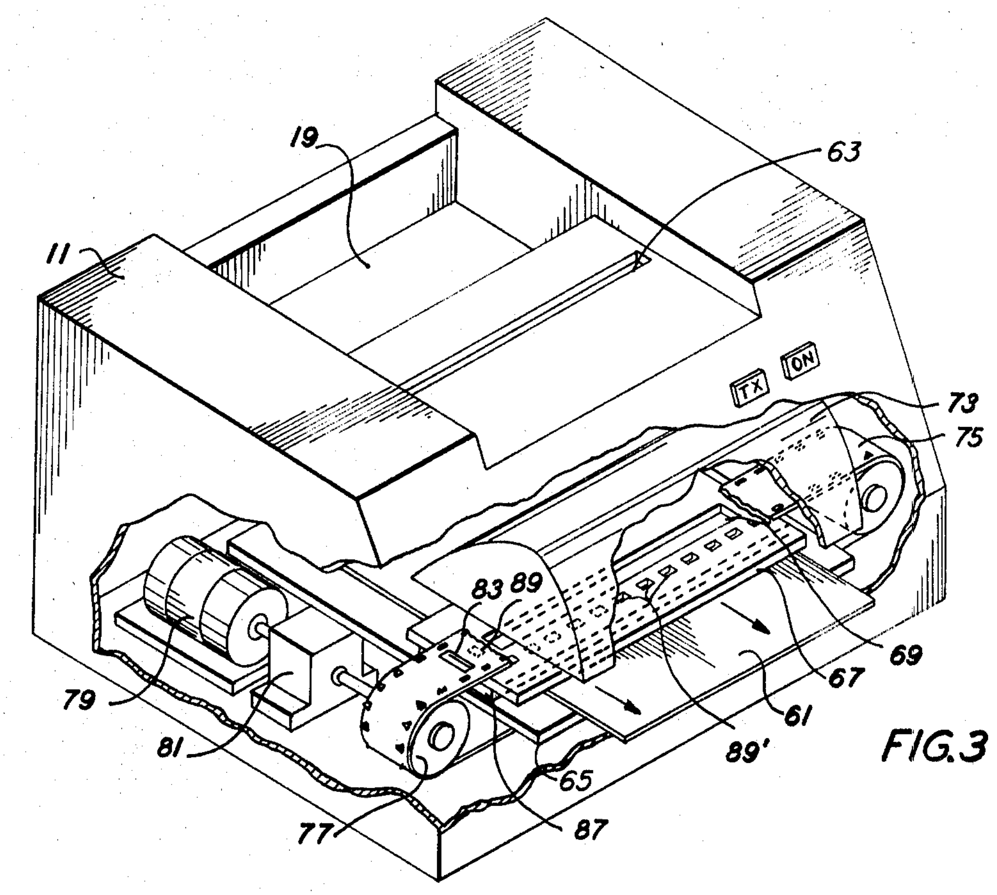
FIG. 3 is a partially broken-away isometric view of scanning apparatus in accordance with one aspect of the present invention.

Referring now to FIG. 3 there is shown a partially broken-away isometric view of a ruggedized, portable facsimile transmitting apparatus in accordance with the present invention. A document 61 to be transmitted is fed through feed slot 63 and by appropriate feed rollers to a document supporting member 65. Disposed above the document support member at the scanning station is a fixed aperture plate 67 having an elongated fixed scanning aperture 69 formed therein which exposes successive line elements of the document 61 for scanning as the document is moved past the scanning station. The document 61 is driven transversely of the fixed scanning aperture 69 in the direction shown by the arrows by means of suitable driving means, for example, rollers actuated by an incremental stepping motor.

An elongated light source 73 is provided which directs light through the elongated slot 69 onto document 61 thereby exposing the light element of the document positioned therebelow. An apertured endless belt scanner 75, partially broken away for purposes of clarity, is supported, for example, by rollers 77 and is positioned to encircle the document support 65 and apertured plate 67 proximate fixed aperture 69. The endless belt 75 is arranged to be driven by a suitable motor 79 through gearbox 81. As hereinafter will be more fully explained the scanning belt 75 may comprise a continuous loop belt of photographic film supported on a polyester base. A plurality of spaced apart scanning apertures 83 in endless belt 75 may be formed in the case of a photographic film supported on a polyester base member (for example, Mylar, Estar) by electronically splicing, i.e., stroke flash exposing through an appropriately dimensioned aperture and developing by reversal development techniques. This procedure results in the generation of a plurality of clear scanning apertures, spaced apart at desired interval, in an otherwise opaque belt. As hereinafter will be more fully explained suitable synchronizing signals may be generated simultaneously with the video signals by appropriately dimensioning and positioning the scanning and fixed apertures and a plurality of synchronizing apertures, respectively.

As the document 61 is moved in the direction of the arrow by suitable drive means it will be seen that successive elemental lines of the document are positioned for scanning adjacent fixed aperture 69. As the fixed scanning aperture and one of the elongated scanning apertures 83 are cooperably juxtapositioned during the motion of scanning belt 75 lengthwise of fixed scanning aperture 69, successive elemental areas of a line to be scanned are selectively illuminated by light from elongated light source 73 through the aperture defined by the intersection of slot 69 and aperture 83 in moving belt 75. This moving pattern of image exploring light is reflected from the successive elemental areas of the document as a function of the information content, i.e., the reflectivity thereof, onto an elongated strip detector 87 which converts the information modulated reflected light rays into analog video signals. As will hereinafter be more fully explained the strip detector in accordance with the principles of the present invention comprises a Silicon Photovoltaic cell which extends the length of the fixed aperture 69 and is supported by member 67 in cooperable juxtaposition with the document so as to receive a majority of incident radiation thereby providing a good signal to noise level.

In operation the document to be transmitted is fed past the scanning station wherein the cooperation of fixed aperture 69 and one of the scanning apertures 83 cooperate to convert successive elemental portions of the document information into video signals. The light scanning apertures 83 of belt 75 are preferably spaced apart a distance greater than the length of elongated fixed aperture 69. As will hereinafter be more fully explained, by spacing apart the scanning apertures 83 of endless belt 75 a distance greater than the dimension of fixed aperture facilitates generating appropriate synchronizing signals intermediate adjacent line scan. The embodiment illustrated in FIG. 3 shows the respective scanning aperture 83 and fixed aperture 69 substantially transverse to the direction of document motion. With this arrangement successive line elements of document are positioned at the scanning station in response to the incremental document advancement. As would be understood by those skilled in the art, the fixed scanning aperture could be skewed to facilitate continuous scanning of successive lines during continuous movement of the document past the scanning station.

Figure 4:
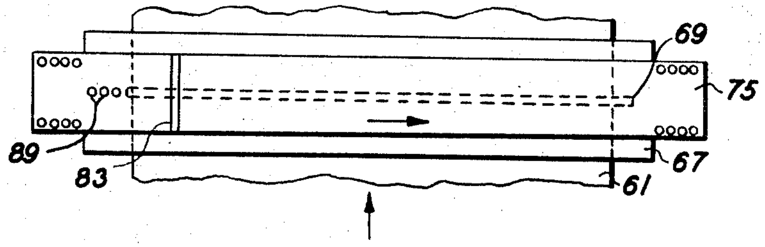
FIG. 4 is a partial top view of an endless belt scanner in accordance with another aspect of the present invention.
Figure 5:
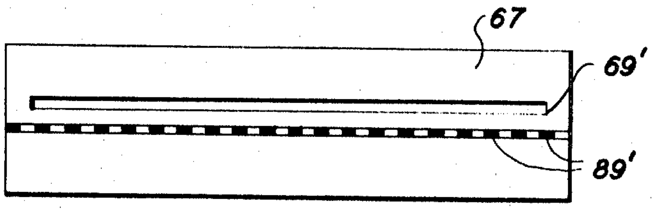
FIG. 5 is a top view illustrating one embodiment of a fixed scanning aperture plate in accordance with an aspect of the present invention.

Referring now to FIGS. 4 and 5 the generation of combined video and sync signals in accordance with another aspect of the present invention will be described. As shown in FIG. 4 motion of the document 61 in the direction of the arrow positions successive elemental line areas of the document in cooperable juxtaposition with the fixed aperture 69 and one of the scanning apertures 83 of the scanning plate and belt, respectively. As shown in FIG. 4 by incorporating a plurality of synchronizing apertures 89 in fixed plate 67 forward in time relative to the beginning of the scan line, suitable synchronizing signals may be generated as the scanning aperture 83 traverses the synchronizing apertures 89. In this manner light from the light source is selectively coupled, as hereinbefore described, through the apertures to generate suitable synchronizing signals.

By employing an enlarged scanning aperture 83, i.e., larger than the fixed aperture 69 in the direction of document travel, suitable synchronizing signals may be continuously generated during line scan operations. As shown in FIG. 5 a plurality of successive synchronizing apertures 89' may be disposed substantially parallel to and spaced apart from the fixed scanning aperture 69. Thus, the motion of the belt and thus the scanning aperture during a scanning cycle, selectively couples light from the light source through the aperture defined by successive portions of the fixed aperture and the scanning apertures and simultaneously through the like apertures defined by a portion of the scanning aperture 83 and the successive synchronizing apertures 89'. As hereinbefore stated, the scanning belt may comprise a selectively flash strobed and reverse developed film supported on a polyester base or a relatively thin metal tape having a plurality of spaced apart apertures formed therearound in a line. In the case of the relatively thin metal, the light apertures may be etched or otherwise conveniently formed in the metal tape. As discussed in conjunction with FIG. 2 the synchronizing signals developed substantially simultaneously with the generation of the video signals may be selectively separated from the composite video and synchronizing signals after amplification and prior to the conversion of the video signal into digital form.

As is known in the art such synchronizing signals may be used to control the scanner and document transport servo systems and be coupled, for example, as one input to the switch tone oscillator for combination with the digitalized video signals before transmission. At the receiver such synchronizing signals may be employed to control standard phasing apparatus to slave the receiver to the facsimile transmitter.

Figure 6:
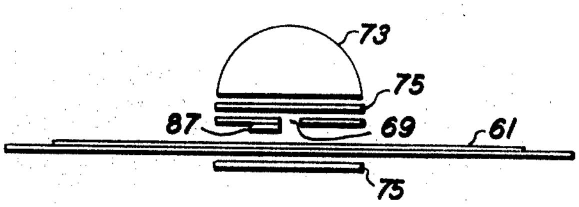
FIG. 6 is a sectional view of the scanner apparatus illustrated in FIG. 3.

Referring now to FIG. 6 a cross-sectional view of a scanning apparatus in accordance with one aspect of the present invention is shown. As the document 61 is transported past the scanning station, image exploring rays from lamp 73 are selectively coupled to successive portions of the document defined by the intersection of the fixed aperture 69 and one of the scanning apertures 83 in that portion of belt 75 proximate the lamp 73. As hereinbefore discussed in conjunction with FIG. 3 the light passing through the aperture defined by the intersection of the scanning aperture and the fixed aperture falls upon the document and the information modulated reflected light rays, i.e., the amplitude is dependent upon the absorption or reflection of the document, impinges upon a portion of photodetector strip 87. While for convenience the strip 87 is shown spaced apart from the document, in operation the strip detector would be cooperably juxtapositioned to receive the majority of incident radiation reflected from the document thereby insuring good signal to noise levels.

Figure 7:
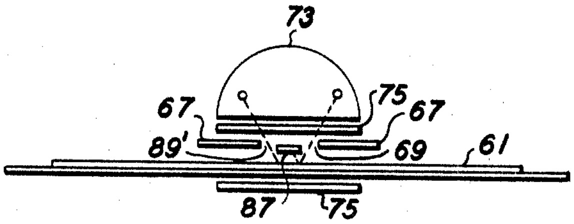
FIG. 7 is a partial sectional view of another embodiment of a scanning apparatus in accordance with the principles of the present invention.
Figure 8A:
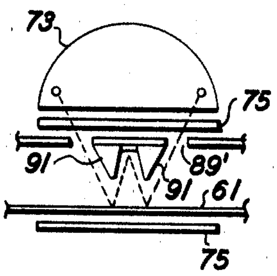
FIGS. 8A and 8B are partial sectional views of modifications of the scanning apparatus illustrated in FIG. 7.
Figure 8B:
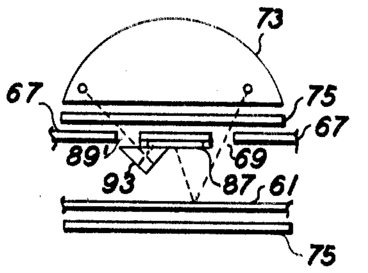

Referring now to FIGS. 7, 8A and 8B other details of applicant's improved ruggedized scanning apparatus will be disclosed. As hereinbefore stated, it is desirable and indeed necessary to generate synchronizing signals at the facsimile transmitter to control the operation of the facsimile receiver in synchronism with the transmitter. As discussed in conjunction with FIGS. 4 and 5 by employing an elongated scanning aperture and a plurality of scanning apertures parallel to the fixed aperture or a normal sized scanning aperture in conjunction with a plurality of synchronizing apertures forward of the fixed aperture in the direction of scan it is possible to conveniently generate combined video and synchronizing signals. These sync signals after separation from the combined signal may be employed to cancel out any difference between such signals and a fixed standard frequency source within a servo loop for controlling the movement of the scanning belt and the document advance at the transmitter. Likewise as hereinabove discussed in conjunction with FIG. 3 such synchronizing signals may be combined with the video signal train during transmission and used to slave the facsimile receiver.

FIG. 7 shows a cross-sectional view of a scanning apparatus in accordance with one aspect of the present invention wherein the fixed scanning aperture 69 and the synchronizing apertures 89' extend in a substantially parallel array at the scanning station. The respective fixed and synchronizing apertures cooperate with the appropriately positioned scanning aperture 83 in moving belt 75 to generate the composite video and synchronizing signals. As hereinbefore described, in operation the illumination from lamp 73 would be selectively coupled through the apertures in belt 75 proximate the lamp and the respective fixed aperture and synchronizing apertures in plate 67. Thus light rays selectively passed to the document through sync aperture 89' and fixed aperture 69 would be reflected onto the photovoltaic strip detector 87 thereby generating the composite video and synchronizing signals.

Other embodiments of ruggedized scanning apparatus in accordance with the principles of the present invention are shown in FIGS. 8A and 8B. In FIG. 8A light baffles 91 had been added to the embodiment of the scanning apparatus illustrated in FIG. 7. Light baffles 91 depend from and are supported by the apertured plate 67 in the area of the strip detector 87. The inclusion of baffles 91 insures that only reflected light rays contribute to the radiation incident upon the strip detector 87. In the embodiment illustrated in FIG. 8B a prismatic element 93 is cooperably positioned relative to the synchronizing apertures 89' of plate 69 and the photodetector strip 87. In this embodiment the light from lamp 73 which is selectively coupled through the respective scanning apertures of belt 75 and synchronizing apertures 89' of plate 67 is directed toward the strip detector 87 through a reflection path in the prismatic element 93. Thus the light rays utilized in generating synchronizing signals are not reflected from the document 61 and thus do not depend upon the reflectance thereof.

Referring now to FIGS. 9A, 9B, and 9C there are shown various views and embodiments of the illuminating apparatus in accordance with the present invention. As shown in FIG. 9A the illuminating apparatus 73 in accordance with one aspect of the present invention preferably comprises an elongated light conductive rod member 95 having a flat 97 provided on one side thereof. Multiple incandescent lamps 99 are immersion coupled into the light conductive member, for example, at the ends and proximate the center thereof. Immersion coupling in accordance with the present invention is defined to mean that the bulb is immersed in a material having a refractive index substantially similar to the light conductive member 95 which, for example, may comprise an acrylic rod. The light containing member is mounted in intimate contact with the bulb exterior and the rod exterior. By employing materials having similar reflective indices, a minimum mismatch at the respective surfaces of the lamp containing member and the mounting apertures of the light conductive member is insured and therefore maximum light is coupled from the illumination source to the rod member. As hereinbefore stated, the illumination apparatus preferably extends along the scanning station the length of the fixed aperture thus providing a line source of image exploring rays from the flat 97 along the dimension of the document to be scanned at the scanning station 98.

As shown in FIGS. 9B and 9C the geometry of the light rod and positioning and type of the light tubes within light conductive rod member 95 may vary considerably. In FIG. 9B an elliptically shaped light conductive rod 95' has a wedge shaped deformity 101 in the side opposite the flat 97. In accordance with this embodiment light sources 103 are positioned at the respective foci of the respective elliptical reflector sections 97 and 98. The light sources 103 may comprise filament incandescent lamps. The wedge shaped deformity in the top of the rod provides a light reflector surface intermediate the respective light sources.

In accordance with the embodiment illustrated in FIG. 9C, elliptically shaped light reflectors 105 are positioned in and supported by the rod member 95''. Light sources 103' are positioned at the respective focus point of the elliptical reflector sections 105.

In the embodiments illustrated in FIGS. 9B and 9C the light sources 103 at the respective focal points of the elliptical reflectors are preferably cooperably juxtapositioned with the fixed aperture and synchronizing apertures, respectively. To insure proper generation and to improve the concentration of light the outer exterior surface of the rod 95' and the elliptical reflectors 105 may comprise a bright metallized finish.

Referring now to FIG. 10 there is shown a transistorized circuit compatible with the strip detector 87 in accordance with one aspect of the present invention. As shown transistor 107 having a collector electrode 109, base electrode 111 and emitter electrode 113 is coupled in a grounded base configuration. The input signal is applied to the emitter electrode and the output capacitive coupled from the collector electrode. As hereinbefore set forth in accordance with the present invention the video signals are generated in response to the selective impingement of light onto a document through the scanning and fixed apertures and the impingement of the reflected information modulated light pattern onto strip photovoltaic cell 87. As shown the photovoltaic cell 87 is coupled in the emitter circuit in series with a potentiometer 115 for varying the bias at the emitter electrode.

As hereinbefore stated the detector in accordance with one aspect of the present invention comprises photovoltaic cell similar to the Texas Instrument SIV 7100 Series which is fabricated hyperpure techniques. The photovoltaic cell shown schematically as diode 87 in FIG. 10 preferably comprises a strip of monocrystal silicon prepared in the manner similar to the hereinabove referenced SIV 7100 Series elements. The diffusion process employed in fabricating the SIV 7100 elements is similar to that employed in the fabrication of solar cells in which a shallow junction is diffused into a silicon bar. Recent developments in the semiconductor art include the successful fabrication of crystalline silicon in ribbon form. By a process disclosed in the literature as the Dendritic process, silicon webs of hyperpure crystalline silicon has been grown in ribbon form up to several meters in length.

By employing the silicon webs formed by the hereinbefore mentioned Dendritic process and the doping process disclosed by Texas Instruments as employed in their SIV 7100 Series photovoltaic cells, it is possible to fabricate a photovoltaic cell of the desired dimensions for use as a detector in accordance with the principles of the present invention. By employing this process it is possible to fabricate photovoltaic cells of a continuous strip cell rather than the prior art mosaic configuration. Cells of the SIV 7100 Series have measured sensitivities of up to 123 kv./watt/cm.$^2$ and thus exhibit suitable characteristics for use as a photovoltaic detector for converting light modulated patterns into video signals.

Referring now to FIG. 11, various aspects of the signal separation in those embodiments of the present invention employing combined video synchronizing signal generation will be discussed. The circuit apparatus employed to separate combined video synchronizing signals may be classified in accordance with the bandwidth capability of the communication link employed in such facsimile apparatus. Two illustrative cases; namely, a narrow band case and a wide band case will be treated.

Figure 11A:
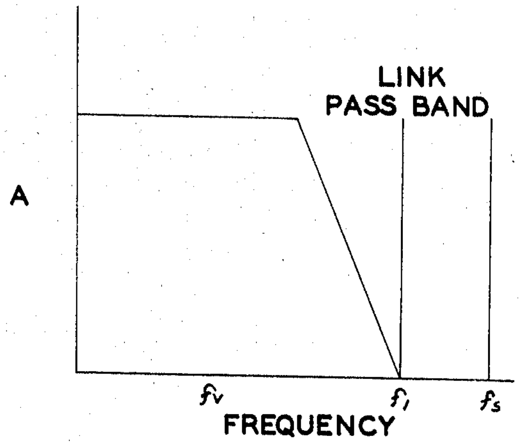
Figure 11B:
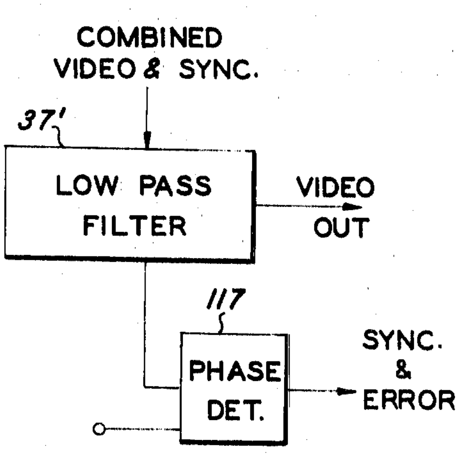

In the narrow band two level case, for example, having a bandwidth in the order of 3 to 4 kilohertz, the problem involves separating the synchronizing signals and cross products thereof from the video spectrum prior to quantization. As hereinbefore stated, in the quantizing step the analog video signal is converted into a two level signal in which the black or information and white or background levels, respectively are characterized. As shown in FIGS. 11A and 11B the separation of video and synchronizing signals may be accomplished in the low frequency or narrow band case by employing a low pass filter 37'. Referring to the Bode plot illustrated in FIG. 11A the separation in the low pass filter occurs by selectively designing the synchronizing frequency $f_s$ above the link pass band $f_L$. This signal separation and selective filtering assures isolation of the synchronizing signals and cross products thereof from the video signals. As disclosed hereinabove and in conjunction with FIGS. 3, 6, and 7 the synchronizing signals $f_s$ after separation from the composite synchronizing and video signals may be employed from phase detector 117 to phase, reset or control generation of a nominal synchronizing signal source.

Figure 11C:
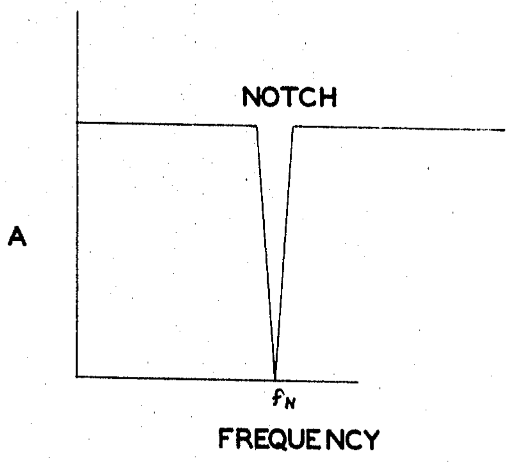
Figure 11D:
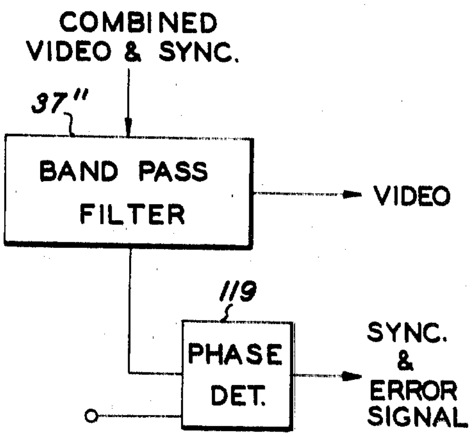

Referring now to FIGS. 11*c* and 11*d* the generation, separation, and utilization of combined video and synchronizing signals in the case for wide band transmission link will be explained. As shown in the Bode plot illustrated in FIG. 11*c* the synchronizing signals may be separated from the video signals by means of a notch filter 37''. The notch filter in the case of 16 and 48 kilohertz channels may comprise a magnetostrictive band-pass filter. The synchronizing signal frequency which corresponds to the center notch frequency of the notched filter 37'' is preferably in the lower portion of the spectrum thus being compatible with readily obtainable narrow band magnetostrictive filters.

To avoid cross modulation products between the synchronizing signals and the video signals, in the wide band case the sync clippers similar to that shown in FIGS. 4 and 5 preferably have a sine wave density pattern rather than the square wave clipper pattern illustrated in the respective drawings. In this manner by matching the belt scan velocity to the distribution of aperture like sinusoidal density patterns at the scanning station, appropriate sinusoidal synchronizing signals may be generated in response to the revolution of the endless tape past the scanning station in the manner hereinabove set forth.

The above methods of simultaneous generation and selective separation of various combined signals in facsimile type systems may be extended to include the generation of carrier signals. Thus, instead of or in addition to the generation of video and synchronizing signals, appropriate carrier signals may be generated by employing appropriately defined chopping apertures similar to the synchronizing apertures 89 and 89' in FIGS. 4 and 5 in conjunction with a moving scanning belt. Separation techniques similar to those hereinabove described may be employed to separate such carrier signals from a composite signal waveform generated in strip detector 87. Thereafter frequency multiplication or phase lock techniques may be employed to generate a carrier signal. Such carrier may then be multiplied or subdivided and selectively transmitted, for example, as hereinabove described in conjunction with the switch tone oscillator.

In the foregoing there has been disclosed various apparatus suitable for constructing a ruggedized facsimile or graphic scanner. The apparatus disclosed herein may be employed in slow speed facsimile equipment or other graphic communication systems and the physical arrangement and dimensions thereof may be varied to suit the intended use. Further, many modifications may be made by those skilled in the art without departing from the scope of the present invention. Appropriate AC/DC operation may be incorporated using conventional AC/battery power techniques. It is therefore applicant's intention to be limited only as indicated by the scope of the appended claims.

I claim:

1. In apparatus for converting graphic information on a document into electrical signals the combination comprising:
   - means for supporting a document to be scanned at a scanning station;
   - illumination means for generating an elongated pattern of image exploring light rays and for projecting said light rays at said scanning station;

slotted plate means for defining video and synchronizing chopping patterns;

endless belt means having a plurality of spaced apart light transmissive portions positioned therearound, said belt means being cooperably juxtapositioned with said slotted plate means for selectively defining video scanning and synchronizing apertures for selectively coupling the exploring rays to successive elemental areas of said document;

means for imparting relative motion between said document and said scanning station;

means for moving said belt means transverse said slotted plate means; and, elongated light responsive detector means adjacent to and extending the length of said slotted plate means for generating combined video and synchronizing signals in response to the impingement thereon of said image exploring rays.

2. In apparatus for converting graphic information on a document into electrical signals the combination comprising:

means for supporting a document to be scanned at a scanning station;

illumination means for generating an elongated pattern of image exploring light rays and for projecting said light rays at said scanning station;

slotted plate means for defining video and synchronizing chopping patterns;

endless belt means having a plurality of spaced apart light transmissive portions positioned therearound, said belt means being cooperably juxtapositioned with said slotted plate means for selectively defining video scanning and synchronizing apertures for selectively coupling the exploring rays to successive elemental areas of said document;

means for imparting relative motion between said document and said scanning station;

means for moving said belt means transverse said slotted plate means; and, elongated light responsive detector means proximate said scanning station for generating combined video and synchronizing signals in response to the impingement thereon of said image exploring rays, wherein said detector means includes a web shaped monocrystal silicon photovoltaic member having a shallow pin junction diffused therein.

3. In apparatus for converting graphic information on a document into electrical signals the combination comprising:

means for supporting a document to be scanned at a scanning station;

illumination means for generating an elongated pattern of image exploring light rays and for projecting said light rays at said scanning station;

slotted plate means for defining video and synchronizing chopping patterns;

endless belt means having a plurality of spaced apart light transmissive portions positioned therearound, said belt means being cooperably juxtapositioned with said slotted plate means for selectively defining video scanning and synchronizing apertures for selectively coupling the exploring rays to successive elemental areas of said document, wherein said endless belt means comprises a loop of opaque photographic film having a plurality of light transmissive portions formed thereabout;

means for imparting relative motion between said document and said scanning station;

means for moving said belt means transverse said slotted plate means; and, elongated light responsive detector means proximate said scanning station for generating combined video and synchronizing signals in response to the impingement thereon of said image exploring rays.

4. In apparatus for converting graphic information on a document into electrical signals the combination comprising:

means for supporting a document to be scanned at a scanning station;

illumination means for generating an elongated pattern of image exploring light rays and for projecting said light rays at said scanning station, wherein said illumination means includes, light conductive rod means having an elongated flat portion formed on one portion thereof for directing light along a line to be scanned, reflector means within said rod means for directing light rays toward said flat, and, lamp means cooperably positioned within said reflector means for generating image exploring rays;

slotted plate means for defining video and synchronizing chopping pattern;

endless belt means having a plurality of spaced apart light transmissive portions positioned therearound, said belt means being cooperably juxtapositioned with said slotted plate means for selectively defining video scanning and synchronizing apertures for selectively coupling the exploring rays to successive elemental areas of said document;

means for imparting relative motion between said document and said scanning station;

means for moving said belt means transverse said slotted plate means; and, elongated light responsive detector means proximate said scanning station for generating combined video and synchronizing signals in response to the impingement thereon of said image exploring rays.

5. The combination defined in claim 4 additionally including light transmissive mounting means for supporting said lamp means and for optimizing illumination coupling from said lamp means to said light conductive rod means.

6. In a facsimile system, graphic scanning apparatus comprising:

means for supporting a document to be scanned at a scanning station;

illumination means for projecting a line pattern of document exploring light rays at said scanning station;

rotatably supported endless belt means having a plurality of spaced apart light transmissive portions disposed therearound for defining successive first scanning apertures at said scanning station during rotation of said endless belt means;

slotted plate means proximate said scanning station and cooperable with said first scanning aperture for defining a video scanning aperture during rotation of said belt means;

aperture plate means proximate said scanning station and cooperable with at least one of said light transmissive portions of said belt means for defining a synchronizing scanning aperture; and, elongated light responsive detector means adjacent to and extending the length of said slotted plate means for receiving light rays passing through said video and synchronizing apertures for generating combined video and synchronizing signals.

7. The scanning apparatus defined in claim 6 wherein said video and synchronizing apertures include separate light transmissive arrays in a common plate member.

8. The scanning apparatus defined in claim 7 wherein said video and synchronizing apertures include an elongated slot and a plurality of evenly spaced apart apertures respectively, and wherein said synchronizing aperture pattern is located proximate one end and in line with said elongated slot.

9. The scanning apparatus defined in claim 8 wherein said video and synchronizing apertures include an elongated slot and a plurality of equally spaced apart synchronizing apertures and wherein said synchronizing aperture array is located substantially parallel to and spaced apart from said elongated slot.

10. The scanning apparatus defined in claim 9 wherein said synchronizing aperture pattern consists of a repetitive pattern of spaced apart, rectangular shaped light transmissive areas in an opaque medium.

11. The scanning apparatus defined in claim 9 wherein said synchronizing apertures consists of a cyclic array of sinusoidally varying density patterns of light transmissive areas in an opaque medium.

12. The scanning apparatus defined in claim 6 additionally including prismatic means cooperably juxtapositioned with said scanning aperture and said detector means for directing light rays from said synchronizing apertures directly onto said detector means.